United States Patent
Bowman et al.

(10) Patent No.: US 10,686,680 B2
(45) Date of Patent: Jun. 16, 2020

(54) SYSTEM AND METHOD FOR DETECTING SOURCES OF ABNORMAL COMPUTER NETWORK MESSAGE

(75) Inventors: Don Bowman, Waterloo (CA); Harmeet Bedi, Waterloo (CA)

(73) Assignee: Sandvine Corporation, Vancouver, British Columbia (CA)

( * ) Notice: Subject to any disclaimer, the term of this patent is extended or adjusted under 35 U.S.C. 154(b) by 1711 days.

(21) Appl. No.: 10/853,099

(22) Filed: May 26, 2004

(65) Prior Publication Data

US 2006/0031464 A1    Feb. 9, 2006

(30) Foreign Application Priority Data

May 7, 2004 (CA) .................................... 2466567

(51) Int. Cl.
| | | |
|---|---|---|
| *H04L 12/26* | (2006.01) | |
| *H04L 29/06* | (2006.01) | |
| *H04L 12/58* | (2006.01) | |

(52) U.S. Cl.
CPC ............ *H04L 43/08* (2013.01); *H04L 43/16* (2013.01); *H04L 51/12* (2013.01); *H04L 63/0227* (2013.01); *H04L 63/1408* (2013.01)

(58) Field of Classification Search
CPC ......... H04L 43/08; H04L 43/16; H04L 51/12; H04L 63/0227; H04L 63/1408
USPC ................................ 709/204–207, 224–226
See application file for complete search history.

(56) References Cited

U.S. PATENT DOCUMENTS

| | | | | |
|---|---|---|---|---|
| 6,044,260 | A * | 3/2000 | Eaton et al. ................. | 455/406 |
| 6,594,706 | B1 * | 7/2003 | DeCoursey et al. .......... | 709/238 |
| 6,708,212 | B2 * | 3/2004 | Porras et al. ................. | 709/224 |
| 6,711,127 | B1 | 3/2004 | Gorman et al. .............. | 370/230 |
| 6,711,608 | B1 | 3/2004 | Ogilvie | |
| 6,941,348 | B2 * | 9/2005 | Petry et al. ................... | 709/206 |
| 6,941,467 | B2 * | 9/2005 | Judge et al. ................... | 726/22 |
| 6,981,020 | B2 * | 12/2005 | Miloslaysky et al. ........ | 709/204 |
| 7,007,299 | B2 * | 2/2006 | Ioele et al. ...................... | 726/14 |
| 7,032,023 | B1 * | 4/2006 | Barrett et al. ................ | 709/225 |

(Continued)

OTHER PUBLICATIONS

Jelena Mirkovic; "D-Ward: Source-End Defense Against Distributed Denial-of-Service Attacks"; A dissertation submitted in partial satisfaction of the requirement for the degree Doctor of Philosophy in Computer Science; XP007906244; 2003; University of California, Los Angeles, USA;.

(Continued)

*Primary Examiner* — Aaron N Strange
(74) *Attorney, Agent, or Firm* — Gowling WLG (Canada) LLP; Neil W. Henderson (57) ABSTRACT

The present invention relates generally to a system and method for the monitoring of email and other message traffic on a network. The intent of the monitoring to determine if message traffic is abnormal, thus indicating unwanted messages such as spam. A number of methods may be utilized by the invention to recognize unwanted messages, including the calculation of fanout, the number of messages sent by a unique host, unique email address or domain. Also included is fanin, the number of messages received from unique hosts, unique domains or unique email addresses. Further components consider the number of error messages received from a host, variations in bandwidth from a host, and variations in message content from a host.

7 Claims, 6 Drawing Sheets

(56) References Cited

U.S. PATENT DOCUMENTS

| | | | |
|---|---|---|---|
| 7,043,759 B2* | 5/2006 | Kaashoek et al. | 726/25 |
| 7,124,438 B2* | 10/2006 | Judge et al. | 726/22 |
| 7,257,564 B2* | 8/2007 | Loughmiller et al. | 706/16 |
| 7,426,634 B2* | 9/2008 | Jain | 713/151 |
| 2002/0120705 A1* | 8/2002 | Schiavone et al. | 709/207 |
| 2002/0144140 A1 | 10/2002 | Ellison et al. | 713/200 |
| 2003/0097439 A1 | 5/2003 | Strayer | 709/224 |
| 2003/0098439 A1 | 5/2003 | Ishibashi et al. | 252/73 |
| 2003/0105976 A1* | 6/2003 | Copeland, III | 713/201 |
| 2003/0172302 A1 | 9/2003 | Judge et al. | 713/201 |
| 2004/0087336 A1 | 5/2004 | Payrits et al. | |
| 2004/0199592 A1* | 10/2004 | Gould et al. | 709/206 |
| 2005/0262209 A1* | 11/2005 | Yu | 709/206 |

OTHER PUBLICATIONS

European Patent Office, Javier Olaechea, Primary Examiner; Communication pursuant to Article 94(3) EPC dated Jun. 16, 2009; Application No. 04 734 649.9; Munich, Germany.

* cited by examiner

SYSTEM AND METHOD FOR DETECTING SOURCES OF ABNORMAL COMPUTER NETWORK MESSAGE

PRIORITY

This application claims the benefit of priority to Canadian Patent Application Serial No. 2,466,567, filed on May 7, 2004.

FIELD OF THE INVENTION

The present invention relates generally to a system and method for detecting abnormal patterns of computer message traffic, the intent being to determine if a host should be ignored as it appears to be sending bulk email, viruses, worms or the like.

BACKGROUND OF THE INVENTION

With the mass growth of the Internet there has occurred a rising flood of unwanted messages. Many of these messages are what are typically referred to as "spam". Spam is the electronic equivalent of junk mail. In addition to junk mail, other messages may include programs such as viruses or worms. One of the intents of a worm is to control a host computer for the purpose of sending more spam. Spam consumes a large amount of network resources as well as wasted time for the users having to deal with it.

There have been many solutions developed to deal with spam and unwanted messages. The most common being the use of filtration software. Filtration software examines the content of a message and determines if the message is wanted or not. Typically filtration software maintains a database of sites known for sending unwanted messages as well as databases of keywords that help to identify an unwanted message. Such a scheme is costly in the use of computer time, as it must scan every message for content and check with a database. Further, it is simple to avoid filtration software by changing the address of the sender and modifying the words of the message. Finally, filtration software may exclude wanted messages based upon what is falsely considered a valid keyword or address match.

An advancement in filtration software is to use Bayesian or heuristic filters to statistically identify unwanted messages based on the frequencies of patterns in the message. These types of filters are weak when dealing with shorter messages, as they do not have enough data to make an intelligent decision.

Another alternative is to create lists of IP addresses that are known to be used by senders of unwanted messages. These are known as "blacklists" and aid in blocking messages from the listed addresses. The problem with this approach is that the blacklisted senders move addresses readily and the person who is reassigned the previous address may still be on the list, thus being incorrectly identified as a spammer.

Thus, there is a need for a means of detecting unwanted messages in a cost effective and efficient manner. The present invention addresses this need.

SUMMARY OF THE INVENTION

The present invention is directed to a method for detecting sources of abnormal message traffic on a network, said method comprising the steps of:

a) utilizing an abnormality detection engine to detect said abnormal message traffic; and
b) reporting on said abnormal message traffic.

The present invention is also directed to a method of wherein said abnormality detection engine consists of one or more of components selected from the set of: a fanout detector, a fanin detector, an error response detector; a bandwidth variation detector; or a message content detector.

The present invention is also directed to a system for detecting sources of abnormal traffic in a network, said system comprising an abnormality detection engine, said abnormality detection engine accepting messages to and from said network and providing a report as output, said abnormality detection engine comprising one or more abnormality detectors, selected from the set of: a fanout detector, a fanin detector, an error response detector, a bandwidth variation detector; or a variation in message content detector.

The present invention is further directed to a computer readable medium, for detecting sources of abnormal message traffic on a network, said medium comprising instructions for:

a) utilizing an abnormality detection engine to detect said abnormal message traffic; and
b) reporting on said abnormal message traffic.

The computer readable medium, wherein said abnormality detection engine consists of instructions for one or more of a fanout detector, a fanin detector, an error response detector, a bandwidth variation detector; or a variation in message content detector.

BRIEF DESCRIPTION OF THE DRAWINGS

For a better understanding of the present invention, and to show more clearly how it may be carried into effect, reference will now be made, by way of example, to the accompanying drawings which aid in understanding an embodiment of the present invention and in which.

DETAILED DESCRIPTION OF THE INVENTION

The present invention is referred to as an "Abnormality Detection Engine", ADE. It is not the intent of the inventors to restrict the use of the invention simply to the detection of spam, but rather to allow it to be utilized to detect any form of unwanted messages.

Figure 1:
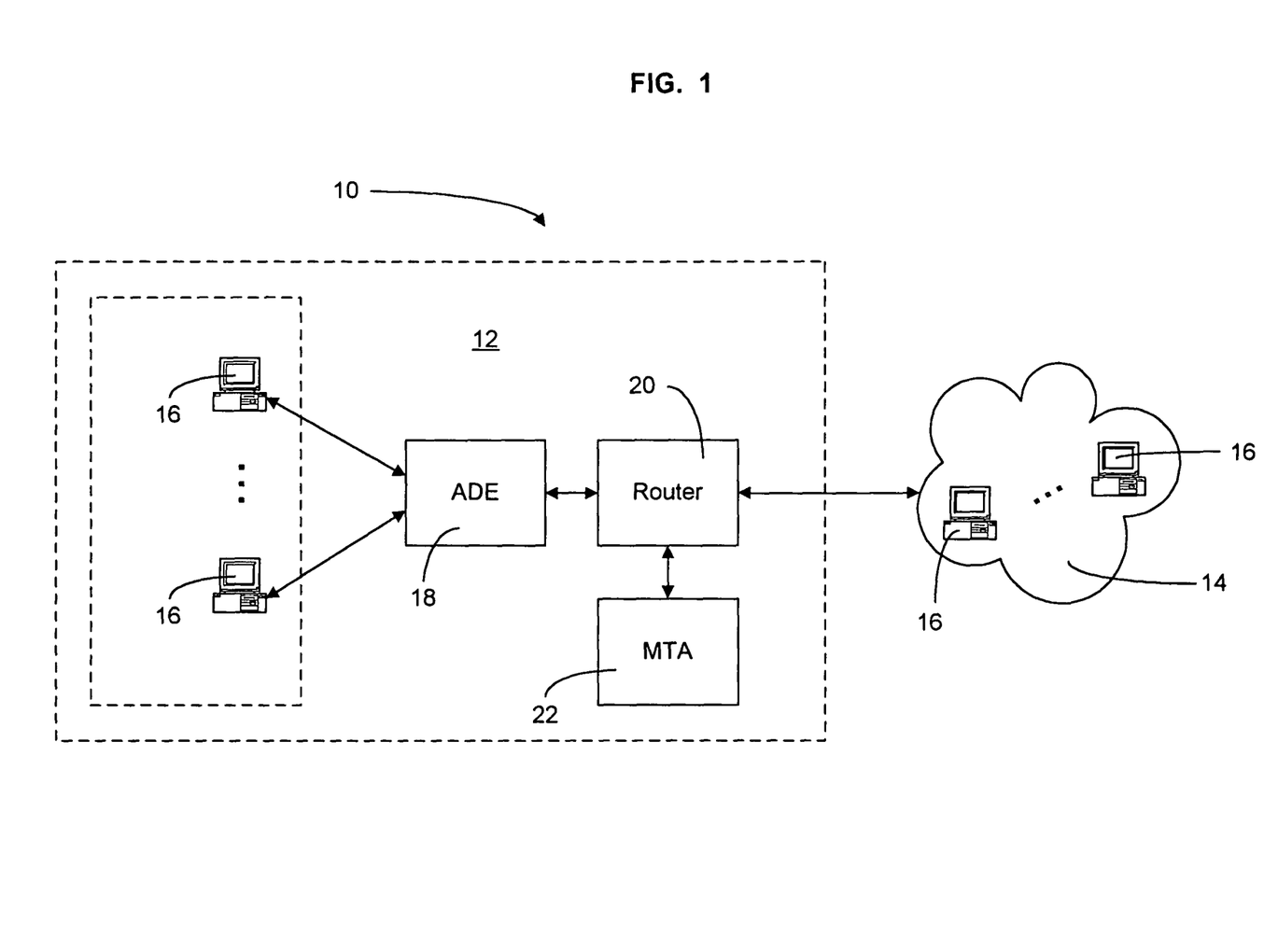
FIG. 1 is a block diagram illustrating how the present invention may be utilized.

Referring now to FIG. 1, a block diagram illustrating how the present invention may be utilized is shown generally as system 10. System 10 comprises an Internet Service Provider (ISP) network 12 and an external network 14. Messages, such as email are exchanged by hosts 16, between networks 12 and 14. Each host 16 is capable of sending and receiving messages. In the case of email, each host 16 will utilize a Mail User Agent (MUA, not shown) such as Microsoft Outlook to send and receive messages. All messages sent between networks 12 and 14 will pass through ADE 18. ADE 18 monitors messages and passes them to or receives them from a router 20. In the case of email messages a Mail Transfer Agent (MTA) 22 is utilized to forward or receive messages. In system 10, MTA 22 is shown as being part of network 12 but it may also reside within network 14.

System 10 is meant merely to indicate how the present invention, residing within ADE 18 may be deployed. As one skilled in the art will recognize, any number of configurations may be utilized to make use of the present invention. By way of example, ADE 18 may reside outside ISP network 12.

Figure 2:
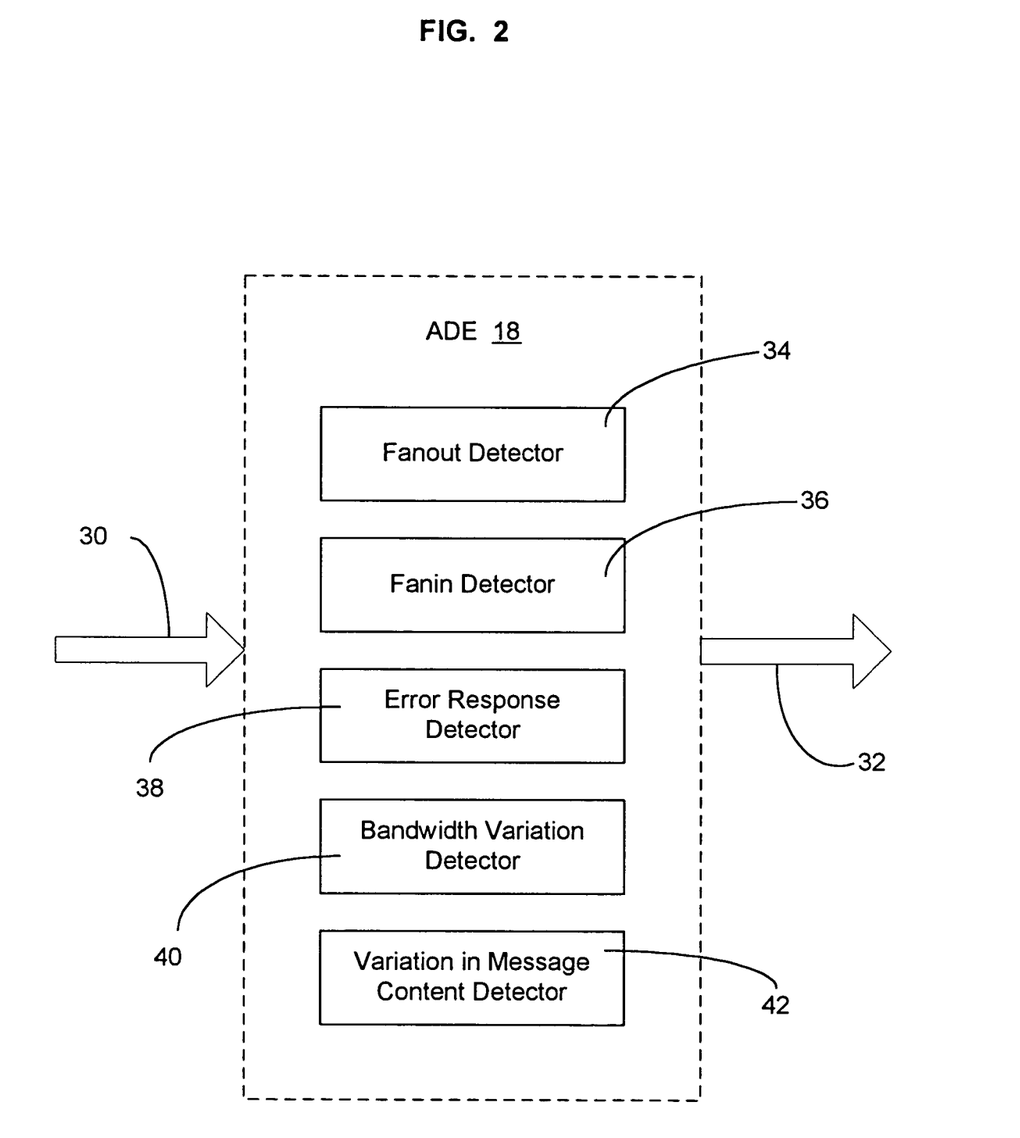
FIG. 2 is a block diagram of the functional components of an Abnormality Detection Engine.

Referring now to FIG. 2 a block diagram of the functional components of an Abnormality Detection Engine is shown. ADE 18 takes as input a data stream 30 and provides as output a stream of reporting data 32. Stream 30 comprises all messages to be monitored by ADE 18. Stream 32 may take any number of forms such as being stored in a database, being displayed to a system administrator graphically, or formatted in reports. The intent of stream 32 is to provide those interested with information on abnormal messages.

ADE 18 comprises five main components, each of which serves as detectors of anomalies in network traffic. One or of more components may be enabled and configured for a specific implementation. Fanout detector 34 examines data stream 30 to determine if an abnormal amount of messages are being sent (Fanout) by a host to multiple addresses. By the term address we mean to include: an IP address, a domain name, an email address and any other means for identifying a unique source or recipient of a message. Fanout can be an indication that a host is sending too many unwanted messages. Fanin detector 36 examines data stream 30 to determine if an abnormal amount of traffic is being received from a single address. Error response detector 38 looks for an abnormal amount of error messages. Messages incorrectly addressed to an MUA are an indication of unwanted messages. Bandwidth variation detector 40 determines if a sender of messages is providing a steady rate of messages. A steady rate of messages is not typical of human use of a network and indicates a source of unwanted messages. Variation in message content detector 42 examines messages to determine if messages coming from a single source are largely the same.

Figure 3:
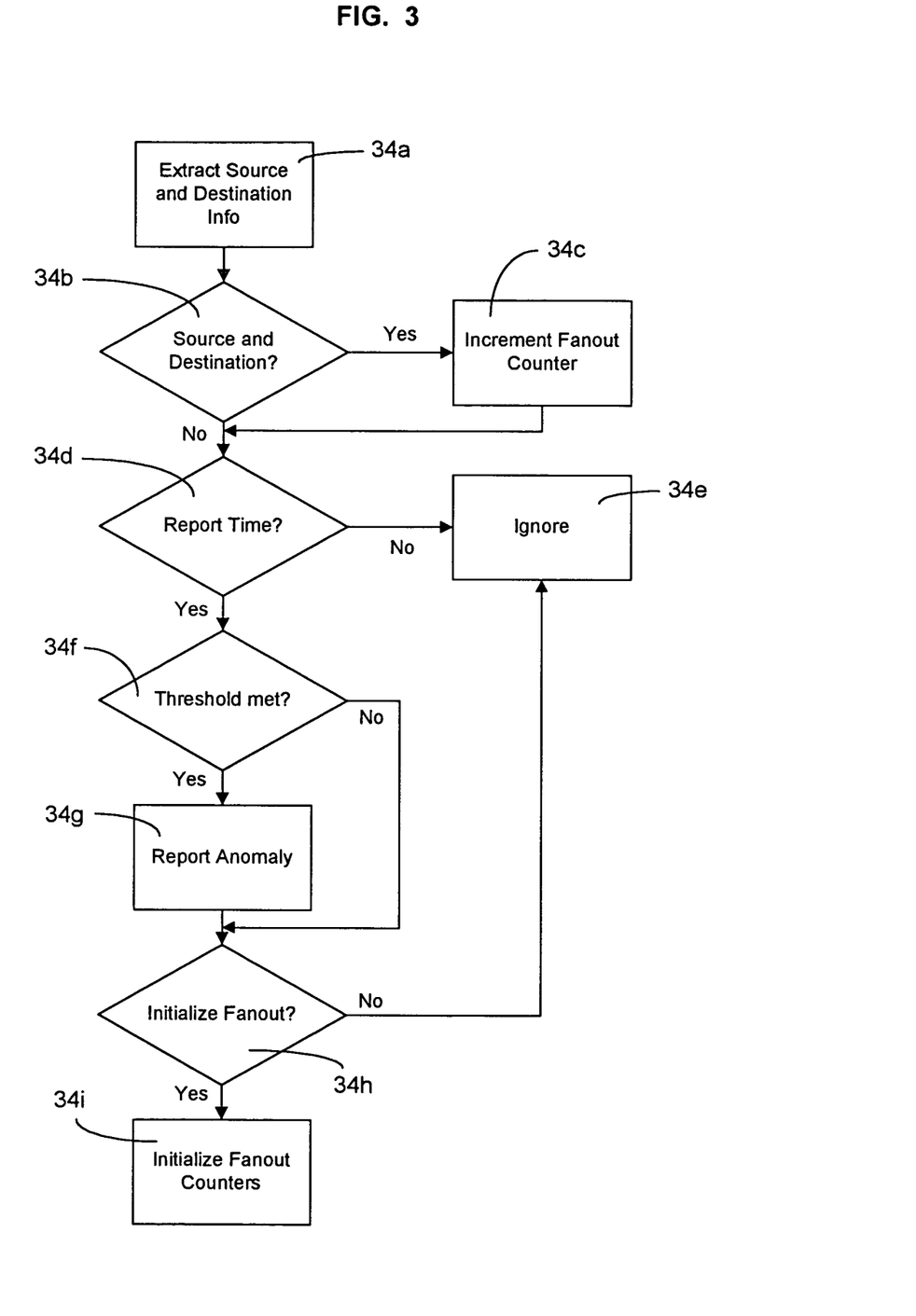
FIG. 3 is a flowchart of the logical structure of the fanout detector.

FIG. 3 is a flowchart of the logical structure of the fanout detector, shown as feature 34 of FIG. 2. Fanout is a measure of distinct addresses. A typical MUA may utilize a few MTA's, so an indication of an increase in addresses may help in determining if a host is being utilized to deliver unwanted messages.

To describe the fanout detector in more detail, we begin at step 34*a*. At step 34*a* information on the source and destination of the current message are extracted. Typically these would be IP addresses, but they could also be domain names or email addresses. By way of example, Simple Mail Transfer Protocol (SMTP) response messages may be monitored through the use of a packet capture library to monitor Transmission Control Protocol/Internet Protocol (TCP/IP) port 25 for email. At step 34*b* a test is made to determine if the source and destination can be determined, if so, the fanout counter for the source and destination pair is incremented at step 34*c*. In the case of SMTP messages, the fanout counter would count the number of messages sent to each unique address. At step 34*d* a test is made to determine if it is time to generate a report on the information collected, if not processing moves to step 34*e* where processing for the current message ends. If it is determined at step 34*d* that a report should be prepared, processing moves to step 34*f*. At step 34*f* a test is made to determine if the threshold for fanout has been met. Experimentation indicates that a threshold value of 20 for each unique address is an indication of sending spam. If the threshold has not been met, processing moves to step 34*h*. If the threshold has been met, processing moves to step 34*g*. At step 34*g* reporting data is prepared to indicate that the destination IP address is a source of abnormal traffic. This report corresponds to reporting data 32 of FIG. 2. The user may wish to reset fanout counters in a deterministic manner, for example on regular schedule, or on memory used. At step 34*h* it is determined if the fanout counters should be reset. If not, processing returns to step 34*e*. If the fanout counters need to be reset, this is done at step 34*i*.

Fanin detector 36 functions in a similar manner as fanout detector 36. The distinction being that fanin detector 36 examines messages to determine if an abnormal number of messages have been received from a unique address as opposed to messages being sent. The logic for fanin detector 36 is identical to that shown in the flowchart of FIG. 3, save that the counters track fanin rather than fanout.

Figure 4:
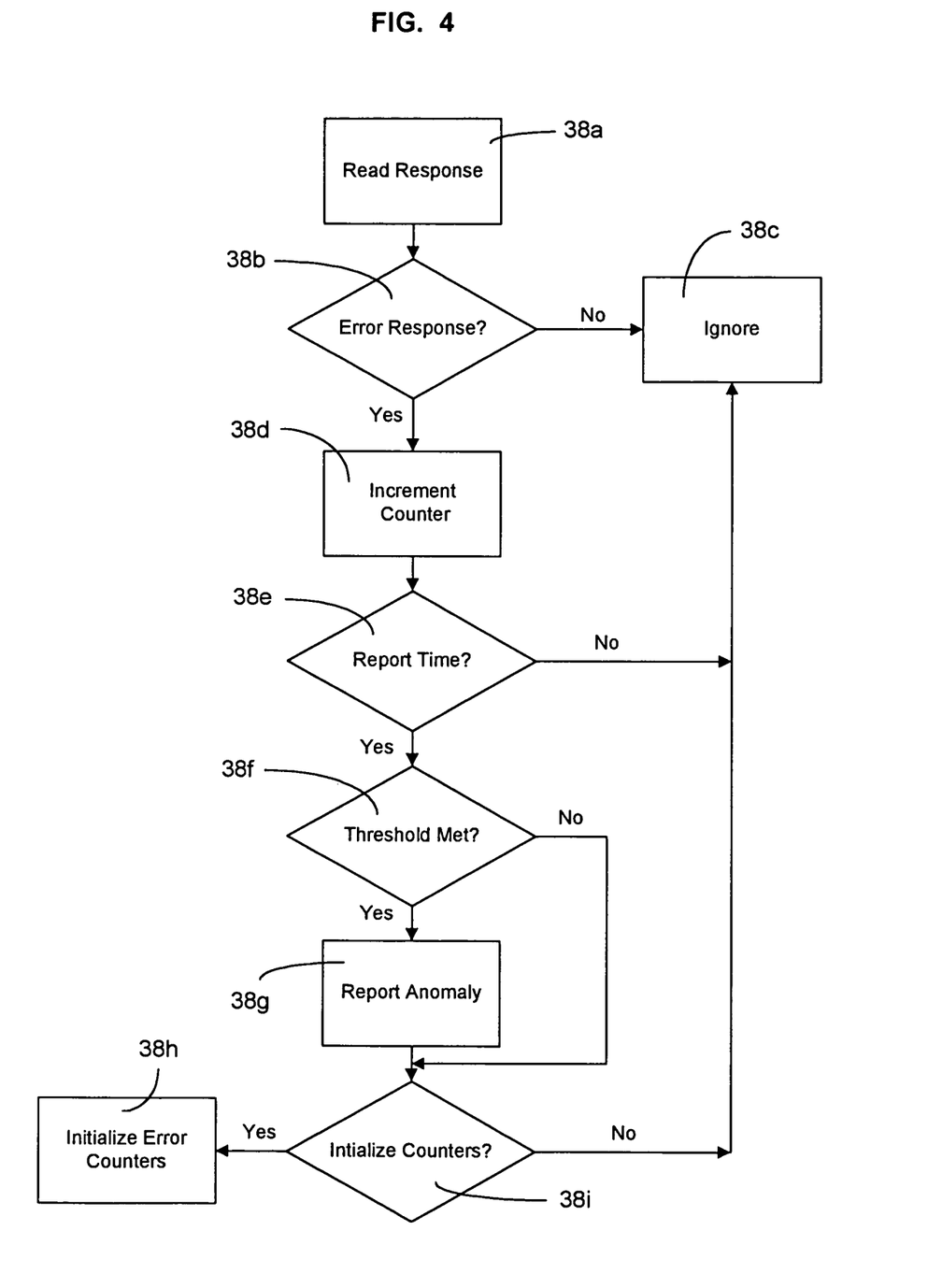
FIG. 4 is a flowchart of the logical structure of the error response detector.

Referring now to FIG. 4 a flowchart of the logical structure of the error response detector, feature 38 of FIG. 2 is shown. Error response detector 38 examines messages to determine if a message is a "reject" message. By way of example, In the case of email an MTA may reject a message and make it known to the sender. Similarly in the case of Hypertext Transfer Protocol (HTTP) a Uniform Resource Locator (URL) may not be found, resulting in a reject message. A well behaved MUA is not likely to receive more than a few reject messages. A large number or reject messages is an indicator of abnormal messages.

Beginning at step 38*a* the response to a message from an MTA is read. At step 38*b*, if the message is not an error response it is ignored at step 38*c*. If the message indicates an error response, processing moves to step 38*d* were a counter for the MTA is incremented. At step 38*e* a test is made to determine if a report, shown as feature 32 of FIG. 2, should be generated. If no report is required, processing ends at step 38*c*. If a report is required, processing moves to step 38*f* where a test is made to determine if a threshold has been met to require the generation of a report. Experimentation has shown that for SMTP messages an error count of ten messages from a unique address is an indication of spam. If the threshold has been met, processing moves to step 38*g* and a report is generated. If not, processing moves to step 38*i*. At step 38*i* a test is made to determine if the error counters should be initialized. The user may wish to initialize the error counters in a deterministic manner, for example on a regular schedule, or on memory used. If so, processing moves to step 38*h* to initialize the error counters, it not processing for the message ends at step 38*c*.

Figure 5:
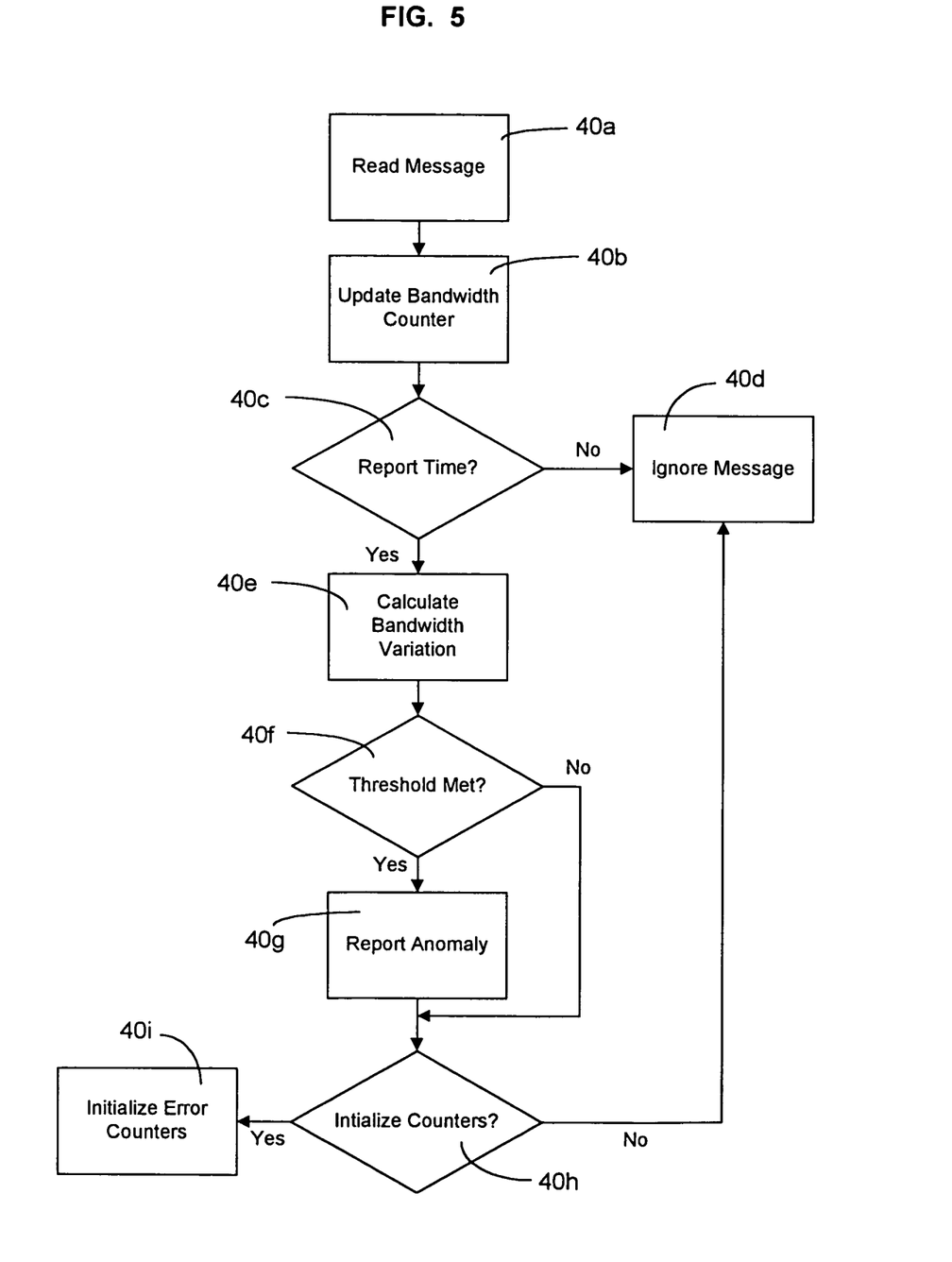
FIG. 5 is a flowchart of the logical structure of the bandwidth variation detector.

Referring now to FIG. 5 a flowchart of the logical structure of the bandwidth variation detector, feature 40 of FIG. 2 is shown. Beginning at step 40*a*, a message is read to determine the destination address of the message. At step 40*b* a counter corresponding to the destination address is updated. At step 40*c* a test is made to determine if it is time to generate a report on bandwidth variation. If the result is negative, processing moves to step 40*d* and the message is ignored. If the result is positive a calculation is made on bandwidth variation. The intent here is to detect anomalies in message traffic. Typically messages from an MUA would be in bursts, consistent traffic may be indicative of a spam host. Any number of schemes may be used to determine if an abnormality in bandwidth variation exists. The use of a moving average has been found to work well. A test is then made at step 40f to determine if the desired threshold for bandwith variation has been met. If so, a report, shown as feature 32 of FIG. 2, is generated at step 40g, if not, processing moves to step 40h. At step 40h a test is made to determine if the bandwidth counters should be initialized. Counter values may take up more memory than desired or a user may wish to have them reset on a regular basis. If counters are to be initialized processing moves to step 40i, otherwise to step 40d.

Figure 6:
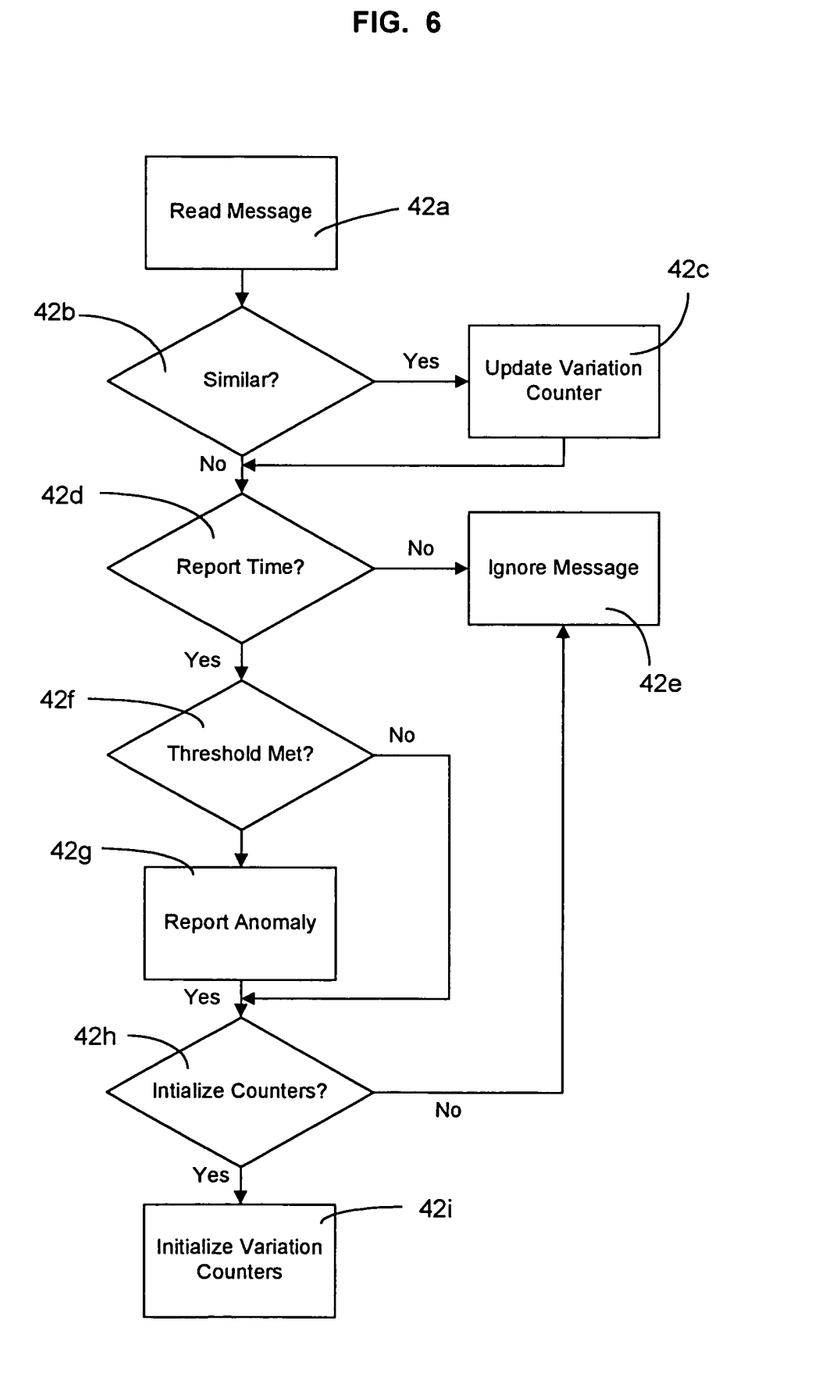
FIG. 6 is a flowchart of the logical structure of the variation in message content detector.

Referring now to FIG. 6 a flowchart of the logical structure of the variation in message content detector, feature 42 of FIG. 2 is shown. Beginning at step 42a, a message is read to determine the content of the message. For unwanted messages such as spam, the message content will scarcely vary. A number of algorithms may be used to detect variation in content, such as hashing the content of the message or a variety of Lempel-Ziv, Huffman encoding or the like. It is not the intent of the inventors to restrict the variation in message content detector to any one algorithm. At step 42b a test is made to determine if the message is similar to others sent from the same address, if so the counter corresponding to the address of the source of the message is updated at step 42c. At step 42d a test is made to determine if it is time to generate a report on variation in message content. If the result is negative, processing moves to step 42e and the message is ignored. If the result is positive, a test is conducted at step 42f to determine if the desired threshold for message variation has been met. If so, a report is generated at step 42g, if not processing moves directly to step 42h. At step 42h a test is made to determine if the variation counters should be initialized. Counter values may take up more memory than desired, and from time to time it may be desired to reset them. If counters are to be initialized processing moves to step 42i, otherwise to step 42e.

Another feature of the present invention, not shown, is to utilize a "white list" within ADE 18. A white list would include information on trusted sources of messages. A message coming from a source on the white list would not be examined by ADE 18.

In this disclosure, the inventors intend the term "counter" to refer to a count of the number of messages for a given address tracked by an abnormality detector, regardless of the abnormality detector in use. If the counter exceeds the threshold for an abnormality detector, a report is generated. For example, if a standard deviation were to be used to detect abnormal messages, the counter would be incremented for those messages that lie on the tails of the distribution.

Although the present invention has been described as being a software based invention, it is the intent of the inventors to include computer readable forms of the invention. Computer readable forms meaning any stored format that may be read by a computing device.

Although the invention has been described with reference to certain specific embodiments, various modifications thereof will be apparent to those skilled in the art without departing from the spirit and scope of the invention as outlined in the claims appended hereto.

We claim:

1. A method for detecting a source or destination of abnormal message traffic on a network, said method comprising:
   tracking messages between a plurality of sources and a plurality of destinations, wherein tracking messages comprises:
      determining the source and destination of a message;
      generating a source and destination pair counter for each source and destination pair;
      incrementing the source and destination pair counter based on at least some of the messages and an amount of messages between said source and said destination;
      determining a bandwidth variation of a rate of messages to a destination, wherein determining the bandwidth variation comprises:
         generating a bandwidth counter for each destination;
         updating the bandwidth counter based on the rate of messages to a destination; and
         determining if a predetermined amount of time has passed; and
   comparing values in the source and destination pair counter to a predetermined source and destination pair threshold and comparing values in the bandwidth counter to a predetermined steady rate of messages after the predetermined amount of time has passed to determine if there is abnormal message traffic related to a source or destination based on both comparisons.

2. The method of claim 1 wherein said traffic is email.

3. The method of claim 1 wherein said traffic comprises HyperText Transfer Protocol messages.

4. The method of claim 1, wherein the at least some of the messages between said source and said destination comprise messages having similar content based on message content detection.

5. The method of claim 1, further comprising:
   generating a report if the source and destination pair counter or the bandwidth counter surpass the predetermined thresholds; and
   initializing either the source and destination pair counter or the bandwidth counter after the report has been generated.

6. The method of claim 5 further comprising:
   tracking error messages between the plurality of sources and the plurality of destinations, wherein tracking error messages comprises:
      determining if an error message is a reject message;
      generating an error message counter for each source or destinations generating the reject message; and
      incrementing the error message counter based on the timing of the error messages.

7. A non-transitory computer readable medium, said medium comprising instructions, which when executed on a processor, cause the processor to perform the method of claim 1.

\* \* \* \* \*